US012781472B2

(12) United States Patent
Matsumoto et al.

(10) Patent No.: US 12,781,472 B2
(45) Date of Patent: Nov. 3, 2026

(54) WORKING VEHICLE

(71) Applicant: TAKEUCHI MFG. CO., LTD., Hanishina-gun (JP)

(72) Inventors: Tetsuya Matsumoto, Hanishina-gun (JP); Kenichi Tanaka, Hanishina-gun (JP); Kazunori Oguma, Hanishina-gun (JP)

(73) Assignee: TAKEUCHI MFG. CO., LTD., Hanishina-gun (JP)

( * ) Notice: Subject to any disclaimer, the term of this patent is extended or adjusted under 35 U.S.C. 154(b) by 247 days.

(21) Appl. No.: 18/626,824

(22) Filed: Apr. 4, 2024

(65) Prior Publication Data

US 2025/0223781 A1 Jul. 10, 2025

(30) Foreign Application Priority Data

Jan. 9, 2024 (JP) ................................ 2024-001313

(51) Int. Cl.
*E02F 9/20* (2006.01)
*E02F 3/32* (2006.01)
(Continued)

(52) U.S. Cl.
CPC .............. *E02F 9/2091* (2013.01); *H02P 5/74* (2013.01); *E02F 3/325* (2013.01); *E02F 3/964* (2013.01); *E02F 9/2228* (2013.01); *E02F 9/2292* (2013.01)

(58) Field of Classification Search
CPC ......... E02F 9/2091; E02F 3/325; E02F 3/964; E02F 9/2228; E02F 9/2292; E02F 3/3405; F02D 29/04; F02D 29/02; F02D 41/042; F02D 41/062; F15B 13/01; F15B 2211/20523; F02N 11/0862; F02N 11/10; F02N 11/101; B60K 6/485; B60K 2025/026; B60K 6/24; B60K 2028/003; B60W 10/06; B60W 10/08; B60W 10/26; B60L 2200/40; B60L 50/66; F04C 2270/041; H02P 5/74; H02P 2101/25;
(Continued)

(56) References Cited

U.S. PATENT DOCUMENTS

2017/0058489 A1* 3/2017 Nomura .................. B60R 25/20

FOREIGN PATENT DOCUMENTS

JP 2003-307142 A 10/2003
JP 2017-187002 A 10/2017
(Continued)

OTHER PUBLICATIONS

Extended European Search Report dated Oct. 14, 2024, issued in counterpart Application No. 24169167.4. (7 pages).
(Continued)

*Primary Examiner* — Antony M Paul
(74) *Attorney, Agent, or Firm* — WHDA, LLP

(57) ABSTRACT

There is provided a working vehicle capable of further improving power consumption by preventing discharging of a battery in situations where discharging is unnecessary. A main controller of a working vehicle is operable when a set time has elapsed in a state where no input operation has been performed from a time when a lock lever was raised and operations of working units via operation levers were disabled, to stop supplying of power from the battery to a first driving unit by turning off a relay via a sub-controller.

4 Claims, 6 Drawing Sheets

(51) Int. Cl.
*E02F 3/96* (2006.01)
*E02F 9/22* (2006.01)
*H02P 5/74* (2006.01)

(58) Field of Classification Search
CPC ........ H02P 2101/45; H02P 27/06; H02P 1/10; H02P 1/54; H02P 3/00; H02P 3/06; H02P 25/18; H02P 27/04; H02P 1/24; A01D 34/10; B66F 7/04; B66F 9/22
See application file for complete search history.

(56) References Cited

FOREIGN PATENT DOCUMENTS

| | | | |
|---|---|---|---|
| JP | 6411935 | B2 | 10/2018 |
| JP | 2022-046172 | A | 3/2022 |
| JP | 2022-104124 | A | 7/2022 |
| JP | 2023-70976 | A | 5/2023 |

OTHER PUBLICATIONS

Office Action dated Sep. 9, 2025, issued in counterpart JP Application No. 2024-001313, with English translation. (6 pages).

* cited by examiner

WORKING VEHICLE

CROSS-REFERENCE TO RELATED APPLICATION

This application is based upon and claims the benefit of priority of the prior Japanese Patent Application No. P2024-001313, filed on Jan. 9, 2024, and the entire contents of which are incorporated herein by reference.

TECHNICAL FIELD

The present invention relates to a working vehicle.

BACKGROUND ART

A hydraulic excavator whose engine stops when a working unit has not been operated for a predetermined time has conventionally been proposed (refer to PTL1: Japanese Laid-open Patent Publication No. 2022-104124). An electric excavator whose driving power source stops when a locking operation that disables operation of the operation levers has been received has also been proposed (refer to PTL2: Japanese Laid-open Patent Publication No. 2023-070976).

SUMMARY OF INVENTION

Technical Problem

Electric motors are quieter than engines, which can make it difficult to tell whether power is still being supplied or whether the supplying of power has been stopped. For this reason, the operator may leave the supplying of battery power on, and if battery power continues to be supplied when the operator is not present, there will be an increase in wasteful power consumption due to the battery being discharged when not necessary.

Solution to Problem

The present invention was conceived in view of the situation described above and has an object of providing a working vehicle capable of further improving power consumption by preventing discharging of a battery in situations where discharging is unnecessary.

An embodiment of the present invention solves the above problem using the configuration described below.

A working vehicle according to an aspect of the present invention includes a plurality of working units that operate on hydraulic pressure; a driving unit that drives the working units; a battery; a main controller; a sub-controller; a plurality of operation levers; and a lock lever.

The main controller is operable when a set time has elapsed in a state where no input operation has been performed from a time when a lock lever was raised and operations of the working units via the operation levers were disabled, to stop supplying of power from the battery to the driving unit by turning off a relay via the sub-controller.

With the above configuration, when the set time elapses in a state where no input operation of a display unit, an operation switch section, or the like has been performed, the machine shuts down by the main controller. By doing so, it is possible to prevent a battery from continuing to discharge when the operator is not present.

As one example, it is effective for the main controller to be operable when the lock lever has been lowered and a start switch has been pressed, to turn on the relay via the sub-controller to start supplying power from the battery to the driving unit, to start operation of the driving unit in a state where a passcode has been authenticated, and to enable the working units to be operated by the operation lever.

As one example, it is effective for the main controller to be operable when there has been an input operation in a period before the set time is reached, to keep the relay in an on-state.

Advantageous Effects of Invention

According to the present invention, a working vehicle capable of further improving power consumption by preventing discharging of a battery in situations where discharging is unnecessary can be realized.

DESCRIPTION OF EMBODIMENTS

Figure 1:
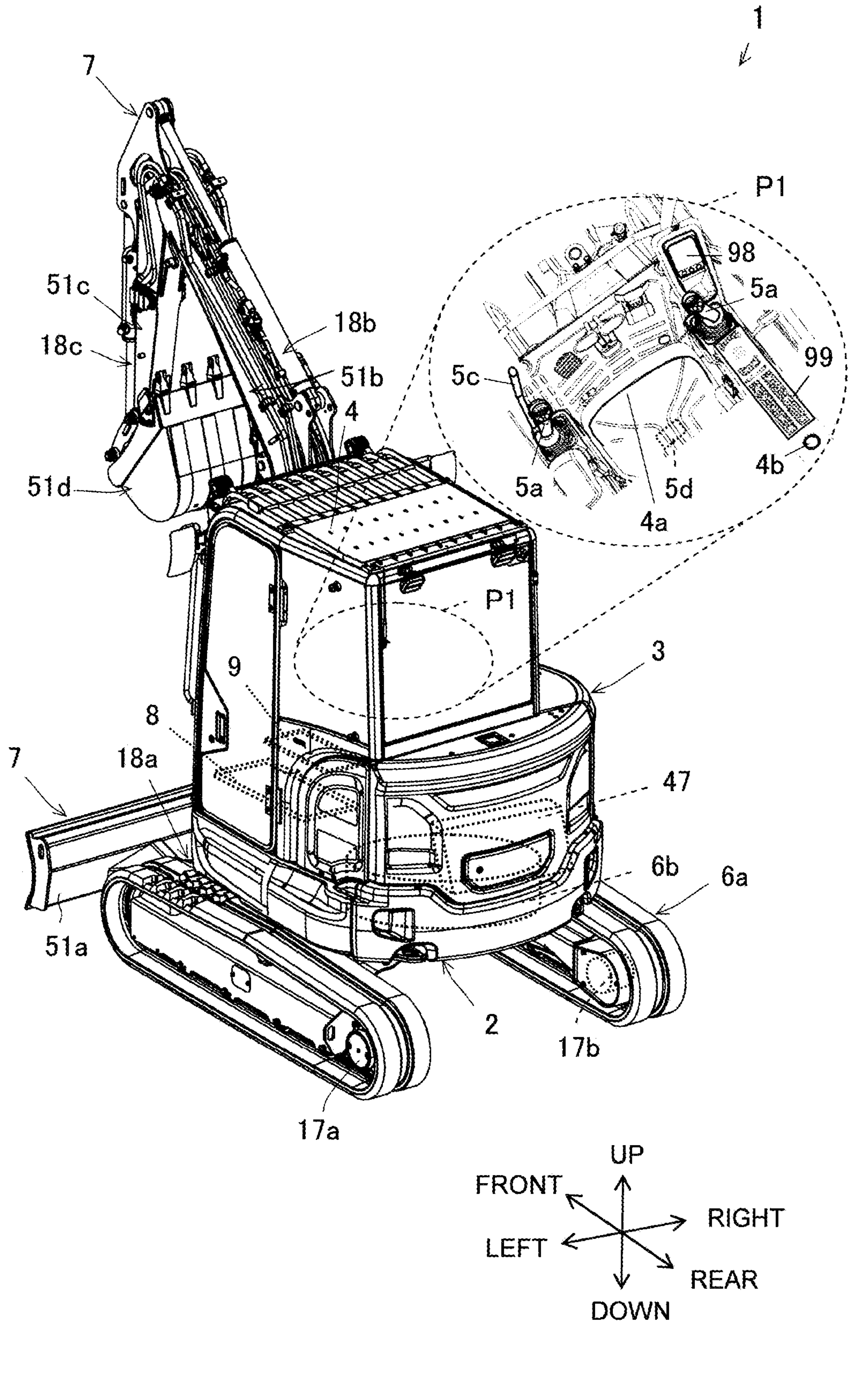
FIG. 1 is a schematic perspective view depicting one example of a working vehicle according to an embodiment.

Several embodiments of the present invention will now be described in detail with reference to the attached drawings. FIG. 1 is a perspective view, from rear upper left, that schematically depicts one example of a working vehicle 1 according to the present embodiment. A hydraulic excavator will be described here as one example. As other example configurations, the working vehicle 1 may be a track loader or a tracked dumper. In addition, members with the same function are denoted by the same reference signs in the drawings used to describe the present embodiments and may not be repeatedly described.

As depicted in FIG. 1, the working vehicle 1 is provided with a lower body 2 capable of travelling and an upper body 3 that is mounted on the lower body 2 and is capable of slewing. The lower body 2 includes a travel unit **6*a* and the upper body 3 includes a cab 4. Here, the part surrounded by a broken line P1 in FIG. 1 is a schematic view of a principal part of the cab 4**.

As one example, the travel unit **6*a* includes a left and right pair of crawlers. The travel unit 6*a* includes a hydraulic motor 17*a* that is a left side driver unit and a hydraulic motor 17*b*** that is a right side driver unit. As an alternative configuration, a travel unit equipped with tires may be used.

The working vehicle 1 includes a battery 49 that supplies electrical power. The battery 49 incorporates a battery pack 47. The working vehicle 1 includes a display unit 98. The display unit 98 is configured to display operation information for a first driving unit 15 and a second driving unit 16, remaining charge information for the battery pack 47, and other well-known vehicle information. An on-board charger is also provided (not illustrated).

As one example, the cab 4 includes a seat 4*a* where the operator boards and sits the vehicle, a lock lever 5*c* disposed to the left of the seat 4*a*, and the display unit 98 disposed to the right of the seat 4*a*. The cab 4 also includes operation levers 5*a* disposed on the left and right of the seat 4*a*.

As one example, a seat switch 5*d* is disposed below the seat 4*a* and a start switch 4*b* is disposed to the right of the seat 4*a*. The seat switch 5*d* is a mechanical switch or a pressure-sensitive switch that is activated by the operator's weight when the operator sits on the seat 4*a*. The start switch 4*b* is a push switch used for both starting and stopping the working vehicle 1.

As one example, an operation switch section 99 is disposed on the right of the seat 4*a*. As one example, the operation switch section 99 includes one or more of a jog dial, a tactile switch, a lever switch, a push switch, a pressure-sensitive switch, and a touch panel.

As one example, the operation switch section 99 includes one or more of an eco mode selection switch, a lift alarm activation switch, a beacon switch, a detent switch, a deceleration switch, a light switch, a wiper switch, and a washer switch.

The working vehicle 1 includes a plurality of working units 7. The plurality of working units 7 are all operated by hydraulic pressure (that is, hydraulic oil at a predetermined pressure).

As one example, the working units 7 include a blade 51*a*. The blade 51*a* is swung in the vertical direction with respect to the lower body 2 by a blade cylinder 18*a*. An arm 51*c* is swung vertically relative to a boom 51*b* by an arm cylinder 18*b*.

One example of a working unit 7 includes the boom 51*b*, the arm 51*c*, and an attachment 51*d*. The boom 51*b* is attached to the upper body 3 so as to be capable of swinging in the forward and backward direction or the forward and backward direction including an upward and downward component. The arm 51*c* is attached to the boom 51*b* so as to be capable of swinging in the forward and backward direction or the forward and backward direction including an upward and downward component. The attachment 51*d* is attached to the arm 51*c* so as to be capable of swinging in the forward and backward direction or the forward and backward direction including an upward and downward component.

As one example, the attachment 51*d* is a bucket that is swung forward and backward relative to the arm 51*c* by a bucket cylinder 18*c*. As one example, the boom 51*b* is swung forward and backward relative to the upper body 3 by a boom cylinder and is swung left and right relative to the upper body 3 by a swing cylinder (not illustrated).

Figure 2:
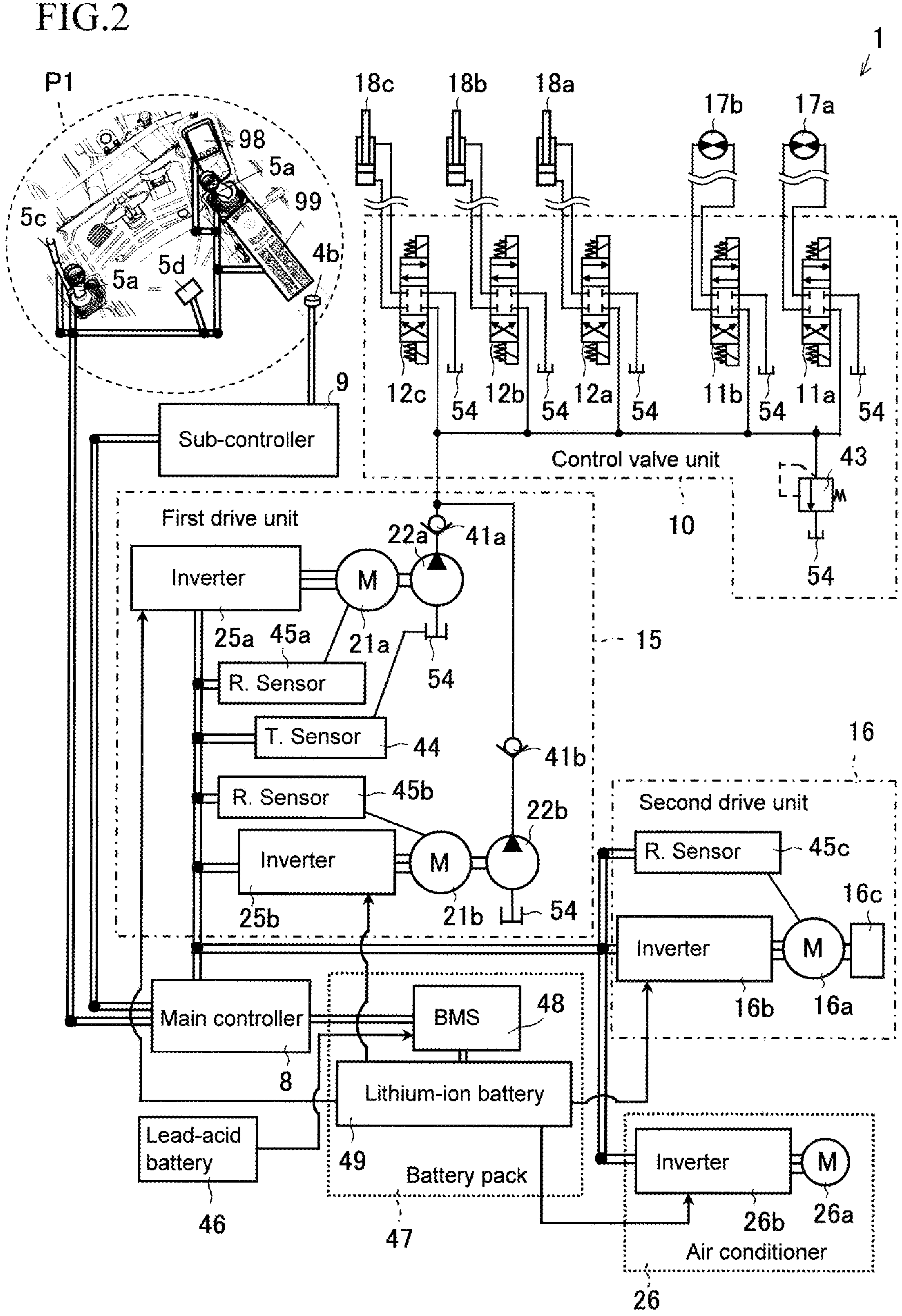
FIG. 2 is a schematic circuit diagram depicting an example of a driving control system of the working vehicle depicted in FIG. 1.

FIG. 2 is a schematic circuit diagram depicting an example of a driving control system of the working vehicle 1. The working vehicle 1 includes the travelling hydraulic motor 17*a* and the travelling hydraulic motor 17*b*, and a first driving unit 15 that supplies hydraulic oil at a predetermined pressure to the blade cylinder 18*a*, the arm cylinder 18*b*, and the bucket cylinder 18*c*. Note that some parts of the circuit diagram in FIG. 2 aside from the principal part have not been labelled.

The working vehicle 1 includes a slewing unit 6*b* that is operated by the second driving unit 16. As one example, the second driving unit 16 includes a slewing electric motor 16*a* that is combined with a speed reducer 16*c* so that a pinion gear of the speed reducer 16*c* meshes with a slew bearing of the lower body 2 (not illustrated).

Figure 3:
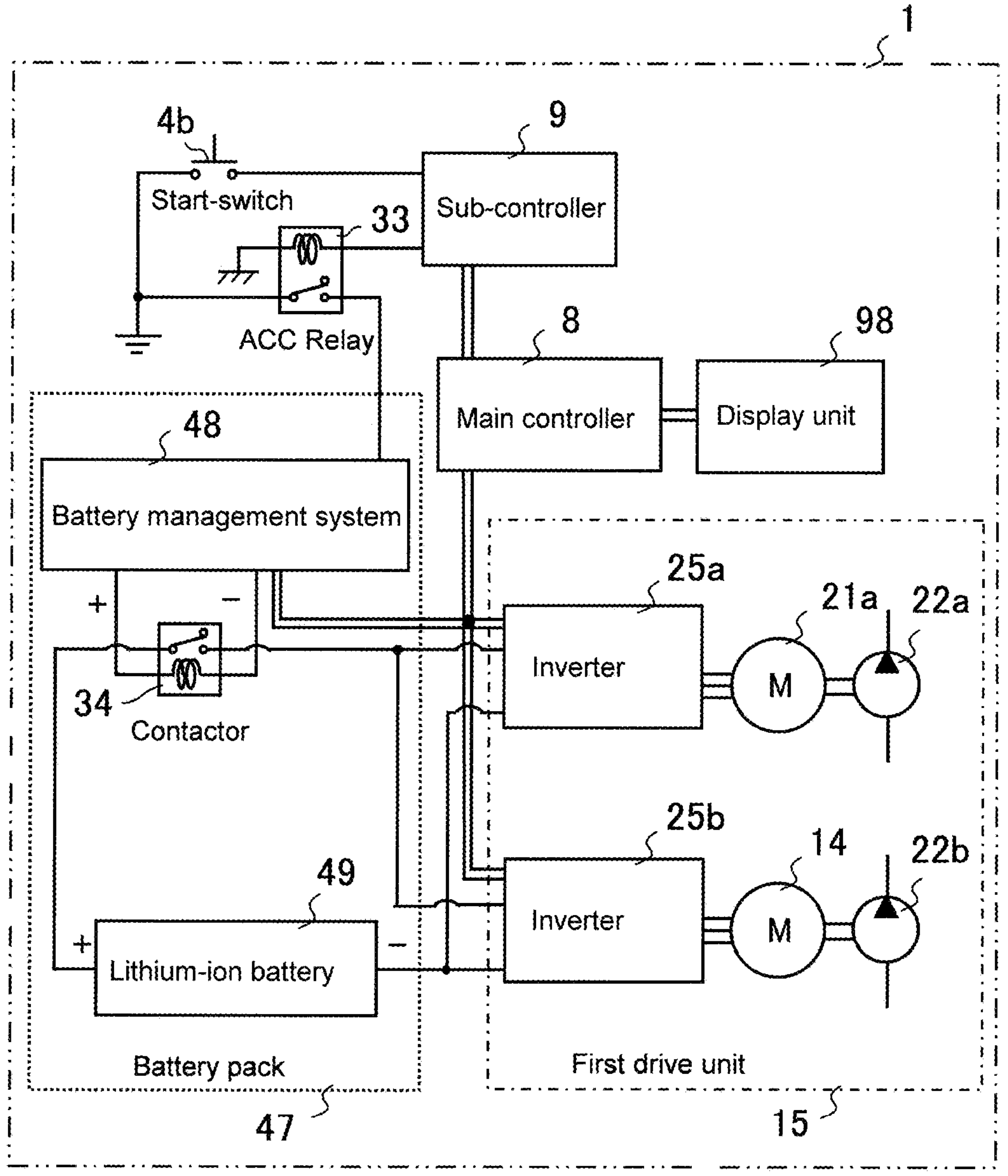
FIG. 3 is a simplified circuit diagram depicting one example of a control system in a periphery of a start switch appearing in FIG. 2.

As depicted in FIG. 2 and FIG. 3, the working vehicle 1 includes the battery pack 47. The battery pack 47 is removably mounted on the working vehicle 1. As one example, the battery pack 47 includes a battery management system 48, the battery 49, and a contactor 34.

As one example, the battery 49 is a lithium-ion battery in which a plurality of cells are combined. The power supply voltage of the battery 49 is 60 to 800 V, for example. Although various sensors are incorporated into the battery pack 47, their wiring diagrams have been omitted from the drawings. As one example, the working vehicle 1 includes a lead-acid battery 46 that powers the battery management system 48 during startup.

The working vehicle 1 starts when the start switch 4*b* is pressed by the operator. The working vehicle 1 includes a main controller 8 (or "vehicle controller") and a sub-controller 9 (or "switch assembly controller"). The main controller 8 transmits a power supplying start signal to the sub-controller 9 when the start switch 4*b* is pressed, and the sub-controller 9 that has received this power supplying start signal turns on a relay 33.

When the relay 33 is turned on, the battery management system 48 turns on the contactor 34. When the contactor 34 is on, the supplying of power from the battery 49 to the first driving unit 15 and the second driving unit 16 is started. After supplying of power has started, the operator operates the operation levers 5*a* to operate the travel unit 6*a*, the slewing unit 6*b*, and the working unit 7.

When the operator has operated the operation levers 5*a*, an operation signal is sent to the main controller 8, and the main controller 8 that has received the operation signal operates the first driving unit 15 and the second driving unit 16. Controller Area Network (CAN) is used as the communication protocol for vehicle control including the main controller 8 and the sub-controller 9. As one example, the relay 33 is an accessory relay connected to an accessory power source.

The first driving unit 15 includes a first hydraulic pump 22*a* that draws in and expels hydraulic oil held in a hydraulic oil tank 54. The first driving unit 15 also includes a first electric motor 21*a* that drives the first hydraulic pump 22*a* and a first inverter 25*a* that supplies power to the first electric motor 21*a* according to an instruction from the main controller 8.

The first driving unit 15 includes a second hydraulic pump 22*b* that draws in and expels the hydraulic oil held in the hydraulic oil tank 54. The first driving unit 15 also includes a second electric motor 21*b* that drives a second hydraulic pump 22*b* and a second inverter 25*b* that supplies power to the second electric motor 21*b* according to an instruction from the main controller 8.

As one example, the first driving unit 15 is configured so that a first output section of the first hydraulic pump 22*a* and a second output section of the second hydraulic pump 22*b* are combined to discharges hydraulic oil to a primary side of a control valve unit 10.

At the control valve unit 10, the primary sides of a plurality of control valves are connected in parallel. In the example in FIG. 2, the primary sides of the hydraulic motor control valves 11*a*, 11*b* and the hydraulic cylinder control valves 12*a*, 12*b*, and 12*c* are connected in parallel. The number of each type of control valve used to construct the control valve unit 10 may be increased or decreased.

The control valve unit 10 includes a relief valve 43, and the primary side of the relief valve 43 is connected in parallel to the primary side of each control valve. The secondary side of the relief valve 43 acts as a return flow path on which hydraulic oil that exceeds a set pressure is returned to the hydraulic oil tank 54.

As one example, the primary side of the first check valve 41*a* is connected to the output side of the first hydraulic pump 22*a*, and the primary side of the second check valve 41*b* is connected to the output side of the second hydraulic pump 22*b*. The secondary side of the first check valve 41*a* and the secondary side of the second check valve 41*b* are combined and connected to the primary side of the control valve unit 10. As one example, the first hydraulic pump 22*a* and the second hydraulic pump 22*b* are both fixed displacement gear pumps. As one example, the first electric motor 21*a* and the second electric motor 21*b* are both embedded magnet motors.

The first driving unit 15 includes a rotation speed sensor 45*a* that detects the rotation speed of the first electric motor 21*a* and a rotation speed sensor 45*b* that detects the rotation speed of the second electric motor 21*b*. The first driving unit 15 includes a temperature sensor 44 that detects the temperature of the hydraulic oil held in the hydraulic oil tank 54.

The second driving unit 16 includes the slewing electric motor 16*a* that is combined with the speed reducer 16*c* and the slewing inverter 16*b* that supplies power to the slewing electric motor 16*a* according to an instruction from a main controller 8. The second driving unit 16 includes a rotation speed sensor 45*c* that detects the rotation speed of the slewing electric motor 16*a*.

As one example, the cab 4 is equipped with an air conditioner 26. The air conditioner 26 includes an air conditioner electric motor 26*a* and an air conditioner inverter 26*b* that supplies power to the air conditioner electric motor 26*a* according to an instruction from the main controller 8.

Figure 4:
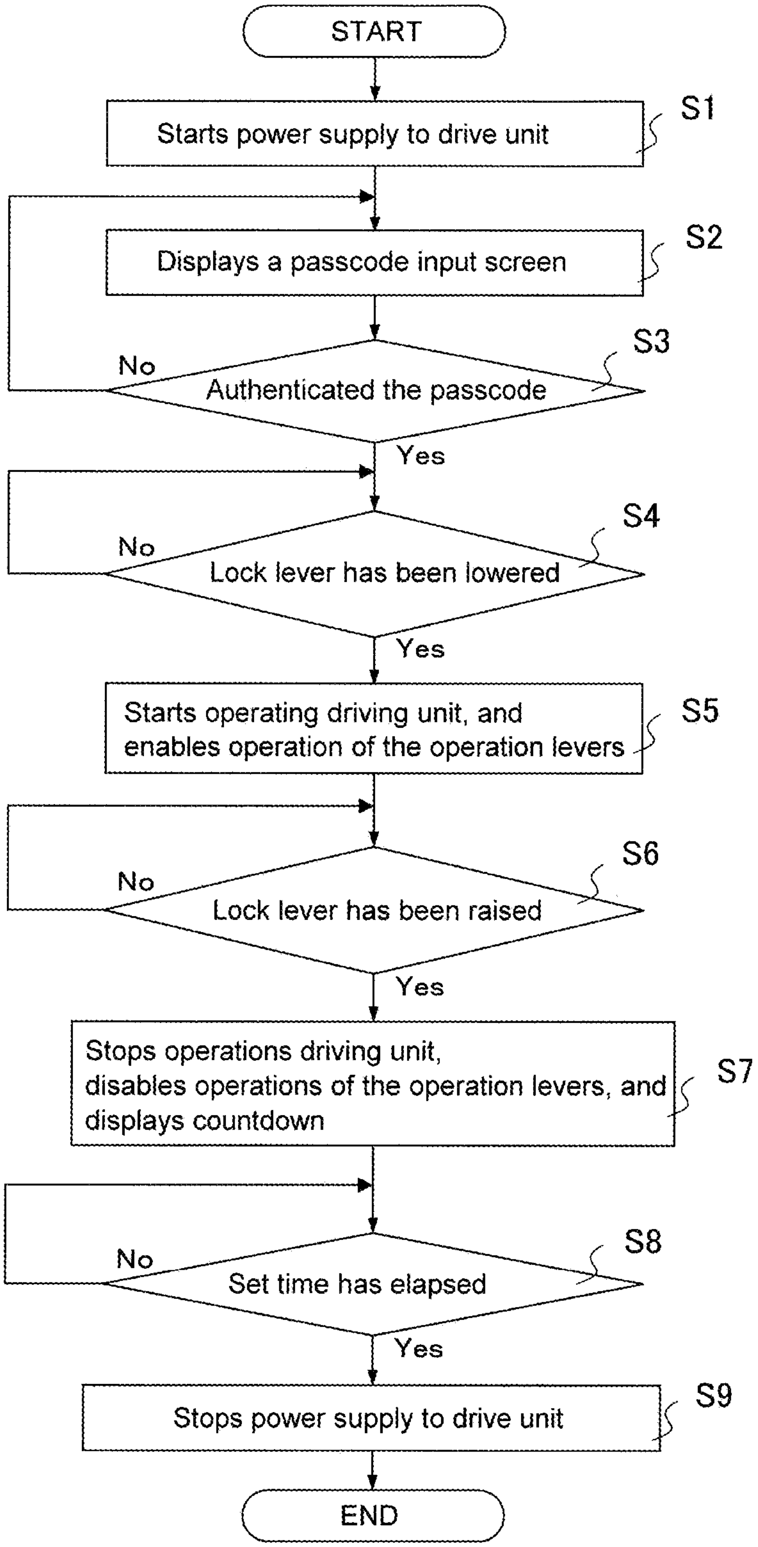
FIG. 4 is a flowchart depicting an overview of an example control procedure for the working vehicle depicted in FIG. 1.

FIG. 4 is a flowchart depicting a simplified overview of an example control procedure by the main controller 8 and the sub-controller 9 of the working vehicle 1. The control procedure depicted in FIG. 4 is composed of steps S1 to S9. Next, the control procedure of the working vehicle 1 will be described.

In step S1 in FIG. 4, the main controller 8 transmits a power supplying start signal to the sub-controller 9 when the start switch 4*b* is pressed. The sub-controller 9 that received the power supplying start signal then turns on the relay 33. When the relay 33 is turned on, the supplying of power from the battery 49 to the first driving unit 15 and the second driving unit 16 starts. When supplying of power has commenced, the processing proceeds to step S2.

In step S2 in FIG. 4, the main controller 8 displays a passcode input screen on the display unit 98. When the passcode input screen has been displayed, the processing proceeds to step S3.

In step S3 in FIG. 4, the main controller 8 authenticates a passcode inputted by the operator. When the main controller 8 has authenticated the passcode, the processing proceeds to step S4. On the other hand, when the main controller 8 has not authenticated the passcode, the processing returns to step S2 and the passcode input screen is displayed again. Alternatively, the processing returns to step S2 and displays the passcode input screen again while displaying an error message.

In step S4 in FIG. 4, the main controller 8 determines whether the lock lever 5*c* has been lowered. When the main controller 8 has determined that the lock lever 5*c* has been lowered, the processing proceeds to step S5. On the other hand, when the main controller 8 has determined that the lock lever 5*c* has not been lowered, the processing returns to step S4.

In step S5 in FIG. 4, the main controller 8 starts operating the first driving unit 15 and the second driving unit 16, enables operation of the plurality of operation levers 5*a*, and proceeds to step S6.

In step S6 in FIG. 4, the main controller 8 determines whether the lock lever 5*c* has been raised. When the main controller 8 has determined that the lock lever 5*c* has been raised, the processing proceeds to step S7. On the other hand, when the main controller 8 has determined that the lock lever 5*c* has not been raised, the processing returns to step S6.

In step S7 in FIG. 4, the main controller 8 stops operations of the first driving unit 15 and the second driving unit 16, disables operations of the operation levers 5*a*, and displays a countdown on the display unit 98, with the processing proceeding to step S8. This countdown display will be described later.

In step S8 in FIG. 4, the main controller 8 determines whether a set time T1 has elapsed. When the main controller 8 has determined that the set time T1 has elapsed, the processing proceeds to step S9. On the other hand, when the main controller 8 has determined that the set time T1 has not elapsed, the processing returns to step S8.

In step S9 in FIG. 4, the main controller 8 transmits a power supplying stop signal to the sub-controller 9. The sub-controller 9 that received the power supplying stop signal turns off the relay 33. When the relay 33 is turned off, the supplying of power from the battery 49 to the first driving unit 15 and the second driving unit 16 is stopped.

Next, a timing chart that schematically depicts driving control in the working vehicle 1 will be described.

Figure 5:
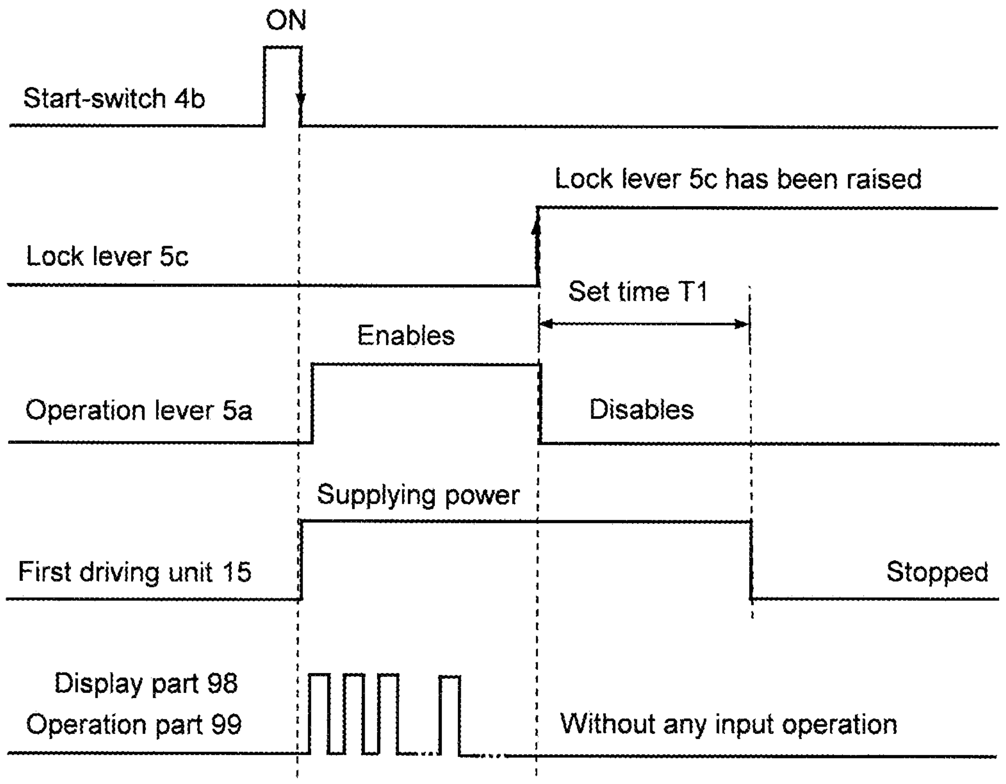
FIG. 5 is a simplified timing chart depicting a first example of a control operation for the working vehicle depicted in FIG. 1.

FIG. 5 is a first example of a timing chart. This first example indicates that when the set time T1 has elapsed without any input operation from the time when operations of the working units 7 by the operation levers 5*a* were disabled, the supplying of power to the first driving unit 15 and the second driving unit 16 is stopped.

Figure 6:
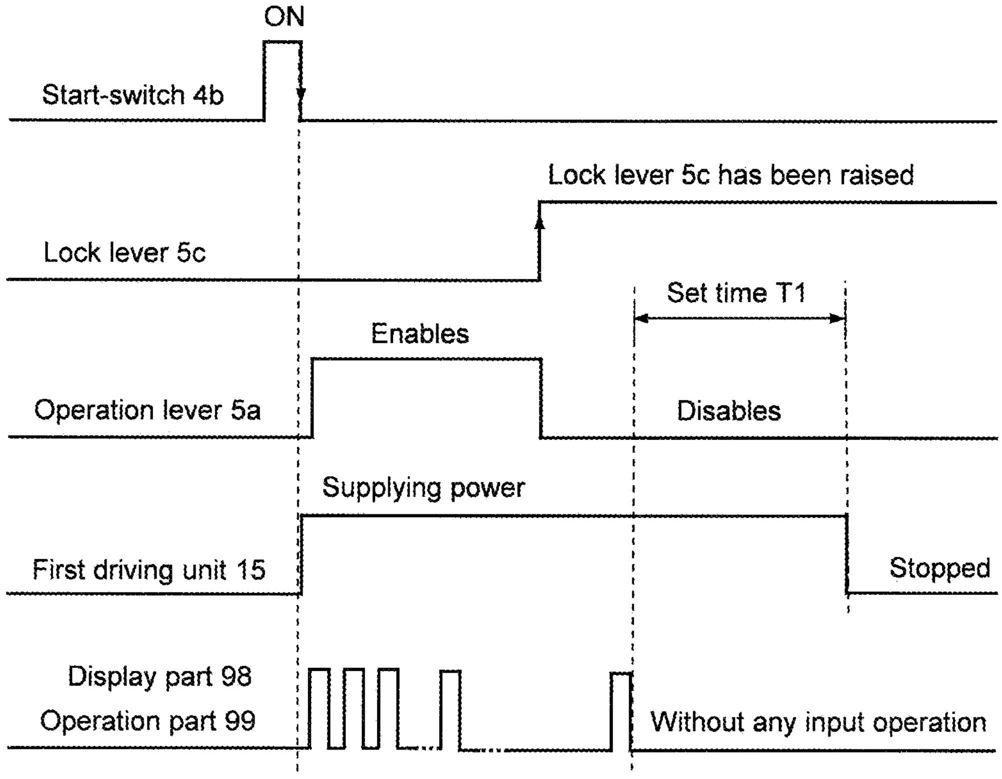
FIG. 6 is a simplified timing chart depicting a second example of a control operation for the working vehicle depicted in FIG. 1.

FIG. 6 is a second example of a timing chart. This second example is an example where an input operation is performed before the set time T1 elapses starting from when operations of the working units 7 by the operation levers 5*a* were disabled. The second example indicates that supplying of power to the first driving unit 15 and the second driving unit 16 is stopped when the set time T1 has elapsed from the end of the most recent input operation.

In step S7 in FIG. 4, if an input operation is performed before the set time T1 elapses, the main controller 8 resets the countdown to the set time T1 and starts counting again from the time when this input operation was performed.

According to this configuration, the relay 33 is kept in the on-state due to the operator operating the touch panel, operation buttons, or the like on the display unit 98 or operating various switches of the operation switch section 99. An automatic shutdown of the machine is not executed, and the countdown to the set time T1 is restarted from zero. By doing so, it is possible to respond flexibly to how the operator is operating the machine and make the machine easier to use.

As one example, the countdown display mentioned above is performed by highlighting an icon, by making an icon blink, or by changing the color of an icon, for example from yellow to red, in a predetermined screen on the display unit 98.

As one example, the main controller 8 highlights an icon when a countdown toward the set time T1 has commenced. After this, the main controller 8 causes the icon to blink when one minute has elapsed from the start of the countdown toward the set time T1. This set time T1 can be changed using a service tool.

As one example, in step S2 in FIG. 4, implementation or non-implementation of an auto-shutdown can be stored in a database for each passcode of a logged-in user.

The auto-shutdown setting status can be inherited the next time the machine starts up.

In addition to the configuration described above, it is also possible to use a configuration where the supplying of power from the battery 49 to the first driving unit 15 and the second driving unit 16 is stopped when the set time T1 has elapsed without any input operation and without the seat switch 5*d* being activated.

In addition to the above configuration, it is also possible to use a configuration where the countdown toward the set time T1 is reset if the seat switch 5*d* is activated before the set time T1 has elapsed, with the countdown restarting from the time at which the seat switch 5*d* was activated.

With the working vehicle 1 according to the present embodiment described above, power consumption by the first electric motor 21*a* and the second electric motor 21*b* can be significantly improved. Limiting supplying time to the first electric motor 21*a* and the second electric motor 21*b* in a state where no predetermined input operation is performed also improves safety.

Note that the driving power source of the working vehicle 1 is not limited to the configuration described above, and it is also possible to use an engine in addition to electric motors. The battery of the working vehicle 1 is also not limited to the configuration described above, and a well-known secondary battery, such as a nickel-metal hydride battery, may be used. In this way, appropriate changes may be made to the working vehicle 1 according to its specification and the like.

What is claimed is:

1. A working vehicle comprising:

a plurality of working units that operate on hydraulic pressure;

a driving unit that drives the working units;

a battery that supplies power to the driving unit;

a battery management system that controls power supply from the battery;

a relay;

a main controller;

a sub-controller;

a plurality of operation levers; and a lock lever, wherein, when a set time has elapsed in a state where no input operation has been performed from a time when the lock lever was raised and operations of the working units via the operation levers were disabled, the main controller turns off the relay via the sub-controller, and the battery management system stops supply of power from the battery to the driving unit.

2. The working vehicle according to claim 1, wherein the main controller is operable when the lock lever has been lowered and a start switch has been pressed, to turn on the relay via the sub-controller to start supplying power from the battery to the driving unit, starts operation of the driving unit in a state where a passcode has been authenticated, and enables the working units to be operated by the operation levers.

3. The working vehicle according to claim 2, wherein the main controller is operable when there has been an input operation in a period before the set time is reached, to keep the relay in an on-state.

4. The working vehicle according to claim 3, further comprising:

a display unit; and an operation switch section, wherein the state where no input operation has been performed is a state where no operation has been performed on either the display unit or the operation switch section.

* * * * *